United States Patent
Tago et al.

(10) Patent No.: US 7,386,157 B2
(45) Date of Patent: Jun. 10, 2008

(54) RADIOGRAPHIC IMAGE PROCESSING METHOD AND APPARATUS

(75) Inventors: Akira Tago, Tokyo (JP); Osamu Tsujii, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 785 days.

(21) Appl. No.: 10/986,383

(22) Filed: Nov. 12, 2004

(65) Prior Publication Data
US 2005/0147285 A1   Jul. 7, 2005

(30) Foreign Application Priority Data
Nov. 14, 2003   (JP)   ............................. 2003-384883

(51) Int. Cl.
*G06K 9/00* (2006.01)
(52) U.S. Cl. ...................................... 382/130; 382/132
(58) Field of Classification Search ................ 382/128, 382/130, 132, 218, 294; 378/98.12; 600/529, 600/534
See application file for complete search history.

(56) References Cited

U.S. PATENT DOCUMENTS

| | | | |
|---|---|---|---|
| 4,729,379 A * | 3/1988 | Ohe ............................ 128/654 |
| 5,359,513 A * | 10/1994 | Kano et al. ............ 364/413.23 |
| 6,067,373 A | 5/2000 | Ishida et al. ................. 382/130 |
| 6,343,143 B1 | 1/2002 | Guillemaud et al. ........ 382/130 |
| 6,363,163 B1 * | 3/2002 | Xu et al. ..................... 382/130 |
| 6,594,378 B1 | 7/2003 | Li et al. ...................... 382/128 |
| 6,904,163 B1 * | 6/2005 | Fujimura et al. ............ 382/131 |
| 2003/0190010 A1 | 10/2003 | Tsujii ........................... 378/23 |
| 2003/0190064 A1 * | 10/2003 | Inoue .......................... 382/128 |
| 2004/0172292 A1 | 9/2004 | Takekoshi et al. ............. 705/2 |
| 2005/0001850 A1 | 1/2005 | Tago et al. ................. 345/619 |
| 2005/0053196 A1 * | 3/2005 | Mostafavi ................ 378/98.12 |

FOREIGN PATENT DOCUMENTS

| | | |
|---|---|---|
| JP | 2003-174590 A | 6/2003 |
| JP | 2003-290193 A | 10/2003 |

OTHER PUBLICATIONS

Machine translation of JP 2003-290193 A.*
Hayashibe, R., et al., "An Automatic Lung Cancer Detection Fron X-ray Images Obtained Through Yearly Serial Mass Survey," Proceedings of the International Conference on Image Processing (ICIP), IEEE, Lausanne, NY, USA (Sep. 1996), vol. 1. pp. 343-346, XP010202217, ISBN 0-7803-3259-8.

(Continued)

*Primary Examiner*—Andrew W Johns
(74) *Attorney, Agent, or Firm*—Fitzpatrick, Cella, Harper & Scinto

(57) ABSTRACT

N images in a respiratory cycle which are radiographed in year P are input, and binary lung field images are extracted from the respective front chest images. Lung field areas S and lung field heights are then calculated. In forming area and height variation waveforms, regions of the N input images are obtained and plotted. Each image is determined as an image belonging to the inspiration mode or expiration mode. The respective images are sorted and stored. Similar processing is performed for N images in a respiratory cycle which are radiographed in year P+1, and the resultant images are stored. Difference images are obtained from the basic images radiographed in year P+1 and the reference images radiographed in year P for each mode by image analysis, thereby extracting changes over time.

5 Claims, 14 Drawing Sheets

OTHER PUBLICATIONS

Liang, J., et al., "*Dynamic Chest Image Analysis: Evaluation Model-Based Ventilation Study With Pyramid Images*," Intelligent Processing Systems (Oct. 1997), ICIPS, 1997 IEEE International Conference on Beijing, China, New York, NY, USA, vol. 2, pp. 989-993, XP010276336, ISBN: 0-7803-4253-4.

* cited by examiner

RADIOGRAPHIC IMAGE PROCESSING METHOD AND APPARATUS

FIELD OF THE INVENTION

The present invention relates to a radiographic image processing method and apparatus which extract changes over time by analyzing a plurality of sets of respiratory moving images which are radiographed along with respiration at different time points and performing difference processing.

BACKGROUND OF THE INVENTION

Recently, there has been developed a system which takes radiographic images of an object by using a large-area semiconductor image sensor. This system has the practical merit of being capable of recording images over an extremely wide radiation exposure range as compared with a conventional radiographic image system which uses silver halide radiography.

That is, the semiconductor image sensor reads X-rays in an extremely wide dynamic range as electrical signals by using a photoelectric conversion means, and converts the electrical signals into digital signals. These digital signals are processed to output radiographic images as visible images to recording materials such as photosensitive materials and display devices such as CRTs, thereby obtaining good radiographic images even if radiation exposure dose varies to some extent.

In radiography using this semiconductor image sensor, kymography which radiographs the lungs along with respiration in the lung field portions is expected to provide new pathological information in place of conventional pathological diagnoses mainly using still images. A radiographic image processing apparatus which can obtain dynamic chest images suitable for diagnosis is disclosed in Japanese Patent Laid-Open No. 2003-290193. In this case, "radiographs the lungs along with respiration" means to radiograph the lungs from a sufficiently expanded state to a sufficiently contracted state so as to obtain moving images; radiography preferably includes one cycle from an expansion phase to a contraction phase of the lungs.

With regard to front chest images radiographed in medical examination and the like, differences between two images radiographed at a time interval are calculated. The effect of obtaining differences over time is that the manner in which a morbid portion changes between the two images can be clearly expressed. With this operation, an improvement in diagnosis by a doctor can be expected. Japanese Patent Laid-Open No. 2003-174590 discloses a method of efficiently generating a difference image from two high-resolution still images radiographed at a time interval. In general, however, conventional chest radiography is generally performed while the breath is held; images which have been provided for time-varying difference processing are still chest images radiographed while the breath is held.

As described above, radiography using a semiconductor image sensor can be continuously performed along with respiration. However, there has been known no difference processing technique between radiographic images radiographed during respiration at a time interval.

Realizing difference display of even a plurality of sets of respiratory moving images radiographed at a time interval without making the object hold his/her breath makes it possible to explicitly display a change in disease. This improves diagnosis accuracy. When a morbid portion overlapping a rib occurs at the time of maximum respiration, since the relative positional relationship between the rib and the lung changes during respiration, the morbid portion can be observed at a specific time point during respiration in some cases.

In chest still image radiography, a patient is generally radiographed while he/she inhales most deeply and holds his/her breath in accordance with an instruction from a radiographer. Therefore, a phase in a respiratory cycle is specified. In contrast to this, when chest moving images are to be obtained by radiography along with respiration, it is difficult to apply X-rays upon specifying a phase in a respiratory cycle.

As a method of applying X-rays upon specifying a phase in a respiratory cycle, a sensor which detects respiration may be additionally used. In this case, however, a tool must be attached to the patient, and radiography becomes complicated.

In addition, normal respiration is performed unconsciously, and respiratory cycles are relatively stable which the object is at rest. On the other hand, at the time of respiratory radiography, it is preferable for an object to take a deeper breath than normal in order to improve diagnostic performance. In this case, however, respiratory cycles greatly vary in radiographic operations as compared with the case of unconscious respiration. Therefore, the difference method for chest still images cannot be simply applied to such operation.

SUMMARY OF THE INVENTION

It is an object of the present invention to provide a radiographic image processing method and apparatus which solve the above problems and obtain differences between a basic image and a reference image which are radiographed along with respiration at different time points in similar phases during respiration.

In order to achieve the above object, according to the present invention, there is provided a radiographic image processing apparatus comprising an input unit which inputs a plurality of respiratory moving images radiographed at two different time points in a respiratory cycle, an image analyzing unit which analyzes the respective respiratory moving images and determines a reference image at one time point which has a respiration phase approximate to a respiration phase of a basic image at the other time point, and a difference computing unit which performs difference computation between the obtained basic image and the reference image.

In addition, according to the present invention, there is provided a radiographic image processing method comprising inputting a plurality of respiratory moving images radiographed at two different time points in a respiratory cycle, analyzing the respective respiratory moving images and determining a reference image at one time point which has a respiration phase approximate to a respiration phase of a basic image at the other time point, and obtaining a difference between the obtained basic image and the reference image and extracting a change between the two images over time.

According to the radiographic image processing method and apparatus of the present invention, of the chest respiratory moving images radiographed along with respiration, a reference image at one time point which has a phase approximate to the respiration phase of a basic image at the other time point is determined, and difference processing between the two images is performed. This makes it possible to cancel out phase differences dependent on radiography and allow accurate difference processing, thus improving diagnostic performance.

In addition, if positioning of a basic image and reference image is performed before difference processing, a more accurate difference image can be obtained, and the diagnosis time can be shortened.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Figure 1:
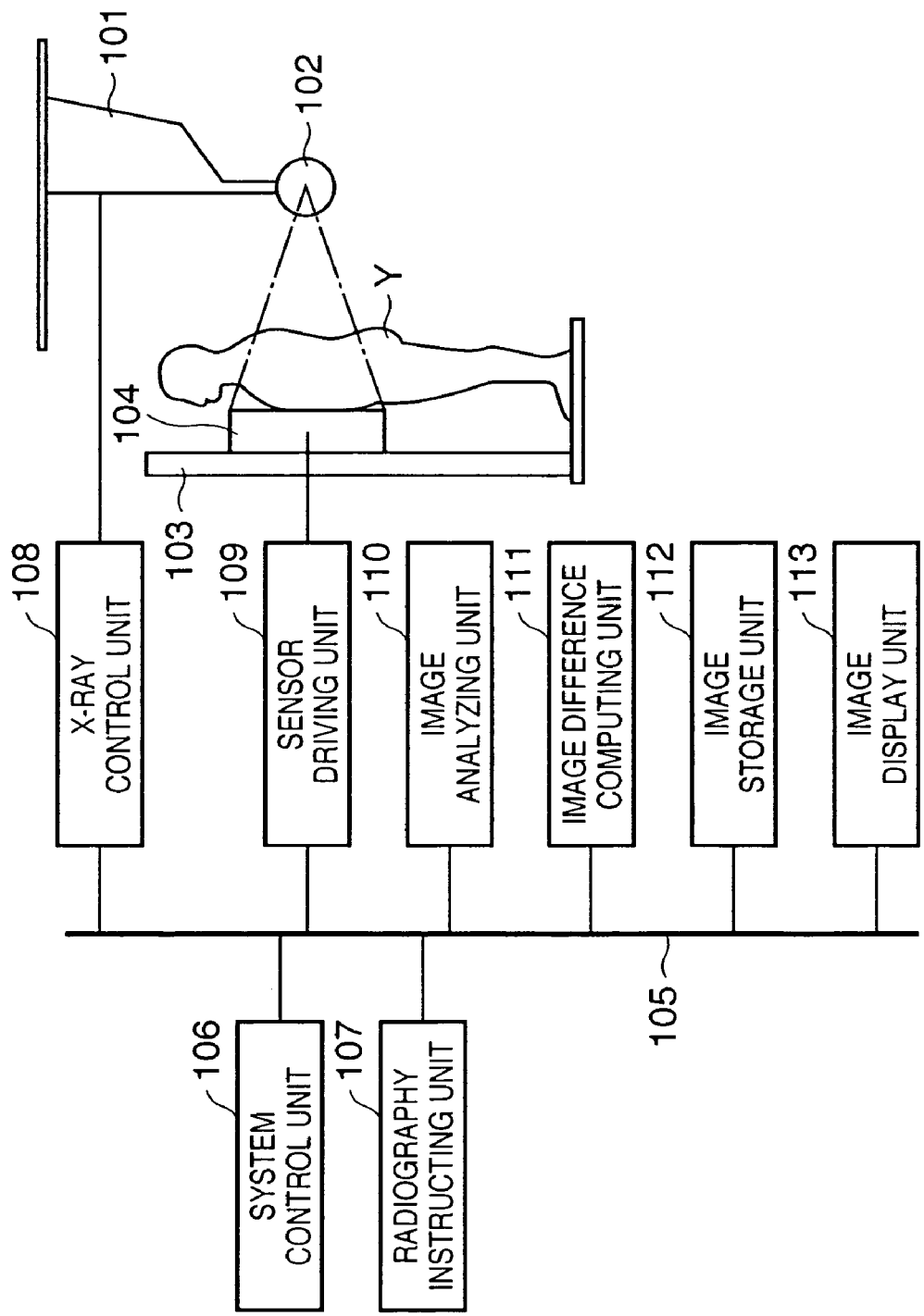
FIG. 1 is a view showing the arrangement of a system according to a preferred embodiment of the present invention.

FIG. 1 is a view showing the arrangement of an X-ray imaging apparatus, in which a two-dimensional X-ray sensor 104 fixed to a stand 103 is placed in front of an X-ray tube 102 suspended from the ceiling through a ceiling suspended portion 101, and an object Y to be examined is positioned on the X-ray tube 102 side of the X-ray sensor 104.

A system control unit 106, radiography instructing unit 107, X-ray control unit 108, sensor driving unit 109, image analyzing unit 110, image difference computing unit 111, image storage unit 112, and image display unit 113 are connected to each other through a system bus 105. The system control unit 106 controls the timing of driving each constituent element and the flow of data. The system control unit 106 can be constructed from computer programs. The output of the X-ray control unit 108 is connected to the X-ray tube 102. The output of the sensor driving unit 109 is connected to the X-ray sensor 104. The sensor driving unit 109 can function as an input unit for inputting a plurality of respiratory moving images radiographed at two different time points during a respiratory cycle. The X-ray sensor 104 is comprised of a two-dimensional amorphous semiconductor and a phosphor screen. For example, the size of each pixel is 160 µm, and the total number of pixels is 2688× 2688.

The X-ray tube 102 is suspended from the ceiling through the ceiling suspended portion 101 and can be moved in accordance with the physique of the object Y. X-rays emitted from the X-ray tube 102 are transmitted through the object Y and reach the X-ray sensor 104. In the X-ray sensor 104, the X-rays are converted into visible light by the phosphor screen (not shown), and the visible light is imaged by the two-dimensional amorphous semiconductor. A radiographer or the like inputs a radiographing timing through the radiography instructing unit 107. The X-ray control unit 108 controls the sensor driving unit 109 to capture an image.

A respiration cycle of the object Y is comprised of an inspiration mode and expiration mode. The inspiration mode is a mode of inspiring air, along which the lung field areas in the rib cage increase, and the diaphragm is pushed down. The expiration mode is a mode of expiring air, along which the lung field areas decrease, and the diaphragm rises.

A respiratory cycle is a respiratory motion including one expiration mode and one inspiration mode. As described above, however, it is difficult to accurately grasp a respiratory cycle while X-rays are emitted from the radiography instructing unit 107 in accordance with an instruction from a radiographer or the like.

Figure 2:
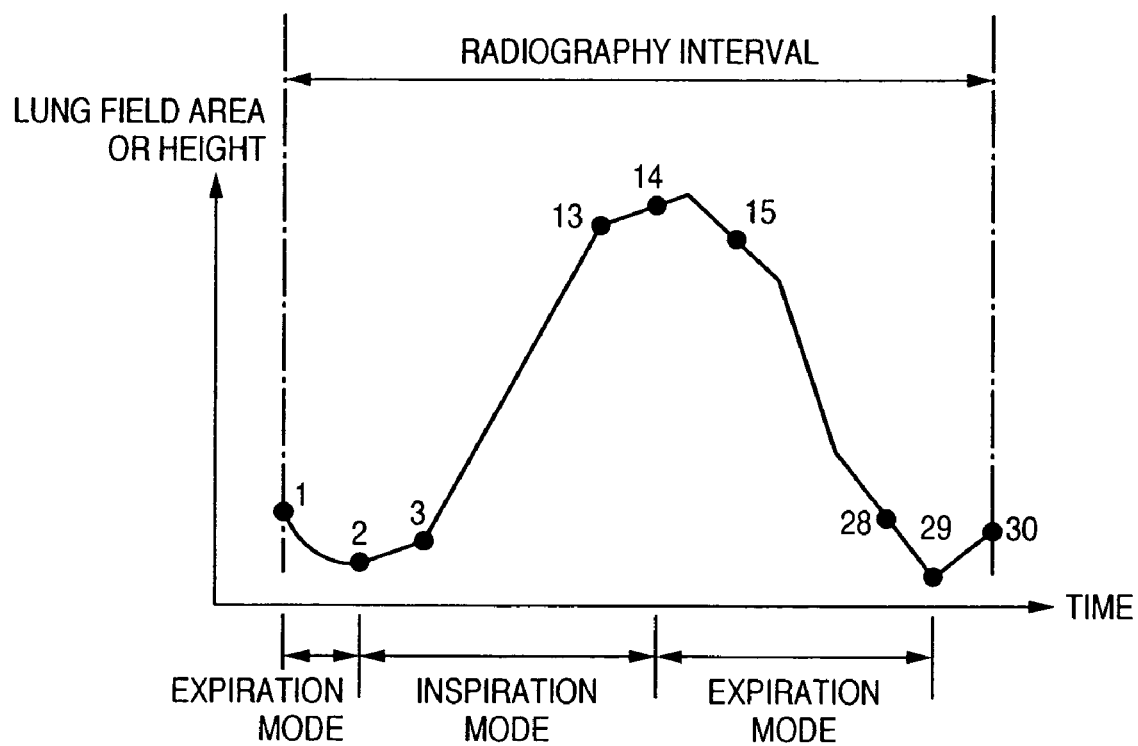
FIG. 2 is a graph in a radiography interval in year P.

FIG. 2 is a graph showing an example of radiography. The abscissa represents the time; and the ordinate, the lung field area or the lung field height from the apex of the lung to the diaphragm. The numerical values in this graph indicate the numbers of times of radiography. During a radiography interval in which X-rays are actually emitted in accordance with an instruction from the radiographer through the radiography instructing unit 107, the operation starts from an expiration mode of the object Y. The lung field area increases in an inspiration mode, and radiography is completed at the end of an expiration mode.

In radiography, the radiographer instructs the object Y to expire or inspire air in a respiration mode. This graph shows the difficulty in performing respiration in accordance with an instruction unlike the case where the lungs are at rest. In this embodiment, an inspiration mode lasts for five seconds, and an expiration mode lasts for five seconds, thus totaling about 10 seconds. Since an X-ray pulse is emitted three times in one second and images corresponding to the X-ray pulses are captured, a total of 30 images are captured in this case.

For the purpose of health maintenance and enhancement of local residents and company members, medical examination is performed periodically, e.g., once a year, and widely. In such medical examination, in order to improve diagnosis accuracy, so-called comparative interpretation is performed, that is, a chest radiographic image currently taken and a chest radiographic image previously taken are compared and observed. Recently, with advances in computer technology, differences between these two images radiographed at a time interval are calculated. The effect of obtaining differences over time is that the manner in which a morbid portion changes between the two images can be clearly expressed.

Such images radiographed along with respiration in year P are transmitted as reference images to the image analyzing unit 110 through the sensor driving unit 109. The image analyzing unit 110 analyzes the collected images to separate and sort them according to the expiration mode and inspiration mode. The image storage unit 112 then stores the images. The image analyzing unit 110 is implemented by the operation of the computer. The image storage unit 112 is formed from the memory of the computer, a magnetic disk, an optical disk, or the like.

When respiratory moving images are radiographed along with respiration in year P+1, these images are transmitted to the image analyzing unit 110 through the sensor driving unit 109 in the same manner as described above. In this embodiment, the images radiographed in year P+1 are regarded as basic images. The image analyzing unit 110 analyzes the images collected in year P+1 to separate and sort them according to the expiration mode and inspiration mode. The image storage unit 112 then stores the images.

The image analyzing unit 110 further makes approximate comparison between the basic images and the reference images, which have been separated and sorted according to the expiration mode and inspiration mode, within each of the inspiration mode and expiration mode. The image difference computing unit 111 performs image positioning and geometrical correction between the basic images and the reference images which are approximate to the respiration phases of the basic images to perform difference computation. This difference computation processing is performed for a plurality of images obtained during respiration. As a result, a plurality of difference processing images are generated. The images subjected to the difference computation processing are sorted according to the sort order of the basic images and stored in the image storage unit 112. The stored difference images are sequentially displayed as moving images on the image display unit 113 in accordance with the instructing unit (not shown) of the operator.

Figure 3:
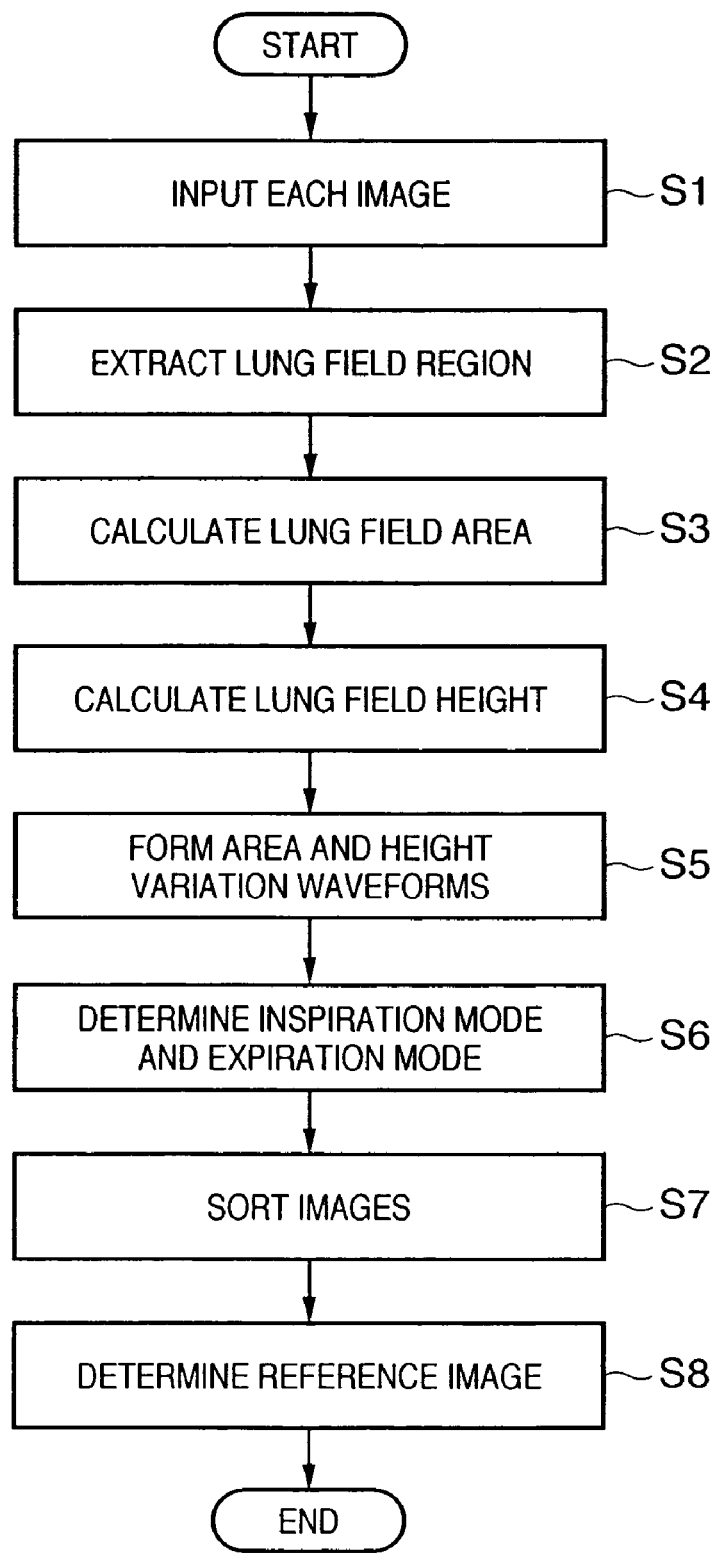
FIG. 3 is a flowchart of image analysis.

FIG. 3 is a flowchart showing image analysis. Assume that N images were radiographed in a respiratory cycle like that shown in FIG. 2 in year P. In this case, in step S1, the N images are input. Referring to FIG. 2, the bullets indicate sensed images, and each numerical number indicates the ordinal number of the corresponding image when counted from the start of radiography.

Figure 4:
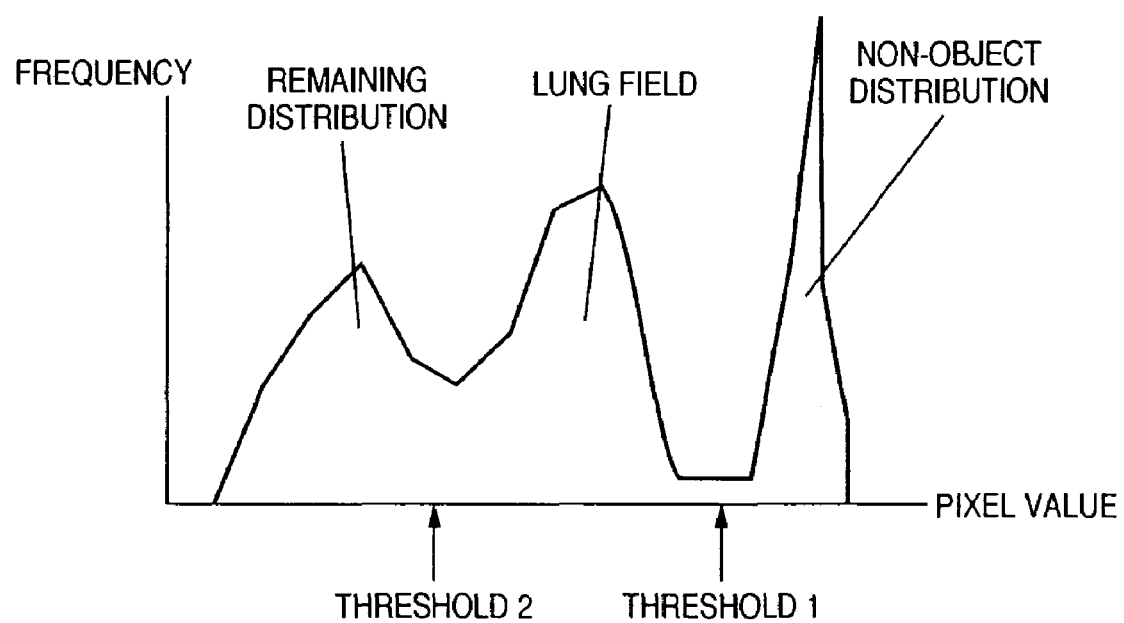
FIG. 4 is a graph showing a histogram of a front chest image.
Figure 5:
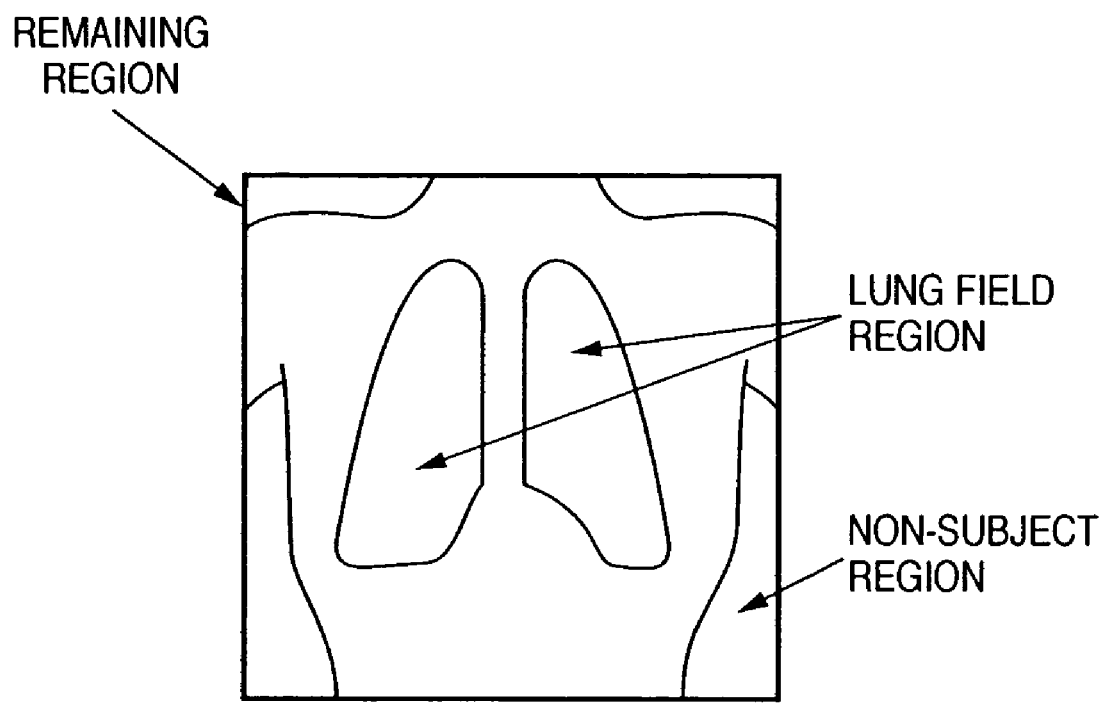
FIG. 5 is a view for explaining the three regions of a front chest image.

In step S2, a lung field region is extracted from each front chest image. FIG. 4 shows the typical histogram of the lung field. The histogram is comprised of three mountain-like regions. As shown in FIG. 5, these are a lung field region, a non-object region, and the remaining region such as a region below the mediastinal portion, heart, or diaphragm. In order to specify a lung field region, an image may be binarized in the intervals of threshold 1 and threshold 2 shown in FIG. 4.

Figure 6:
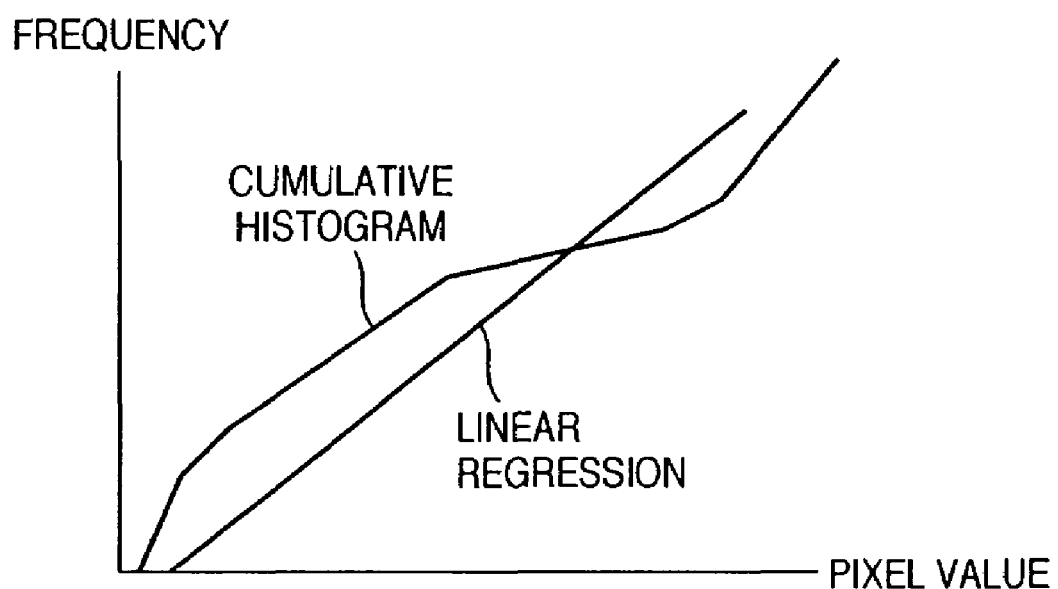
FIG. 6 is a graph showing a cumulative histogram and linear regression.
Figure 7:
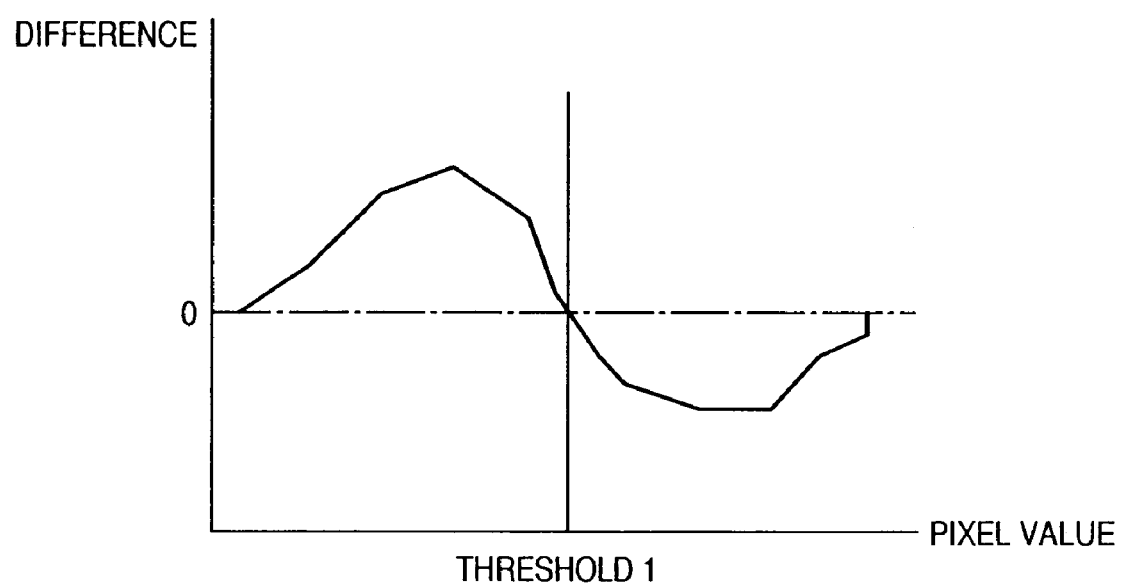
FIG. 7 is a graph showing the difference between the cumulative histogram and the linear regression.

FIG. 6 shows a cumulative histogram corresponding to the histogram shown in FIG. 4, and a line obtained by linearly regressing the cumulative histogram. The pixel value at the intersection between the cumulative histogram and the linear regression empirically indicates threshold 1. More specifically, as shown in FIG. 7, the difference between the cumulative histogram and the linear regression is calculated, and the point where the difference crosses the zero indicates threshold 1.

Figure 8:
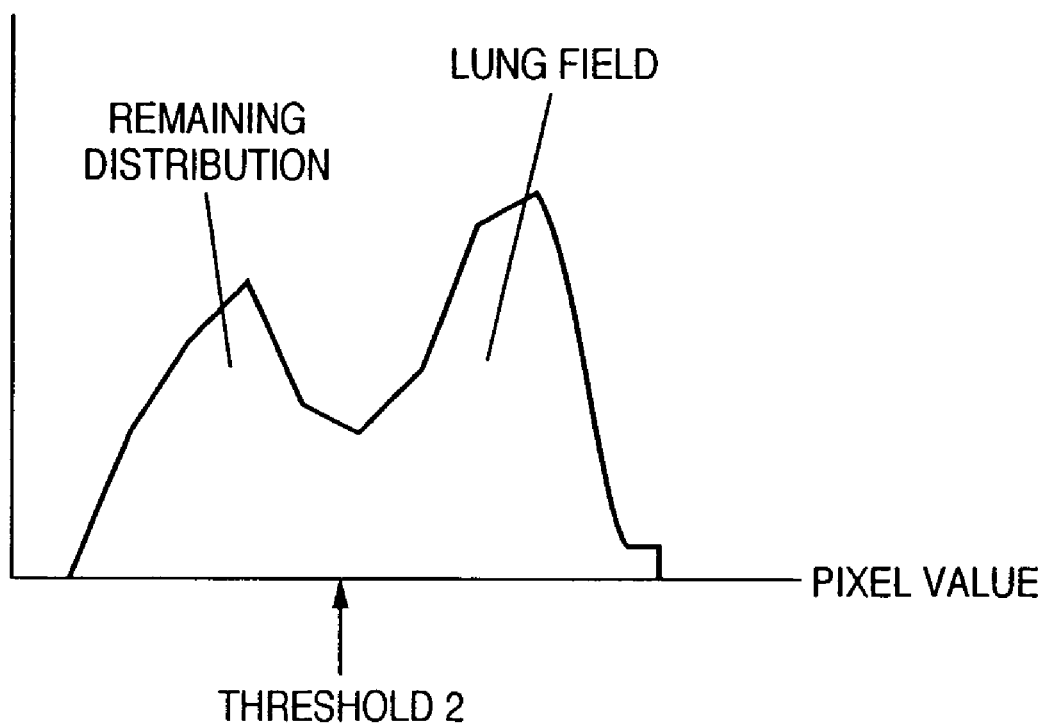
FIG. 8 is a graph showing a histogram of that portion of the front chest image which is equal to or lower than threshold 1.

When threshold 1 is obtained in this manner, the histogram shown in FIG. 8 can be calculated by removing regions with levels equal to or higher than threshold 1 from the image, and calculating the histogram of the remaining region. Although not shown, assume that a cumulative histogram corresponding to the histogram in FIG. 8 is further calculated, the difference between the cumulative histogram and the linear regression is calculated, and the point where the difference crosses the zero is obtained. In this case, the resultant value almost corresponds to threshold 2. When the input image of the chest portion is binarized such that pixel values between threshold 1 and threshold 2 are set to be "1", and the remaining pixel values are set to "0", a lung field region can be extracted. This binary image will be referred to as a binary lung field image hereinafter.

Figure 9:
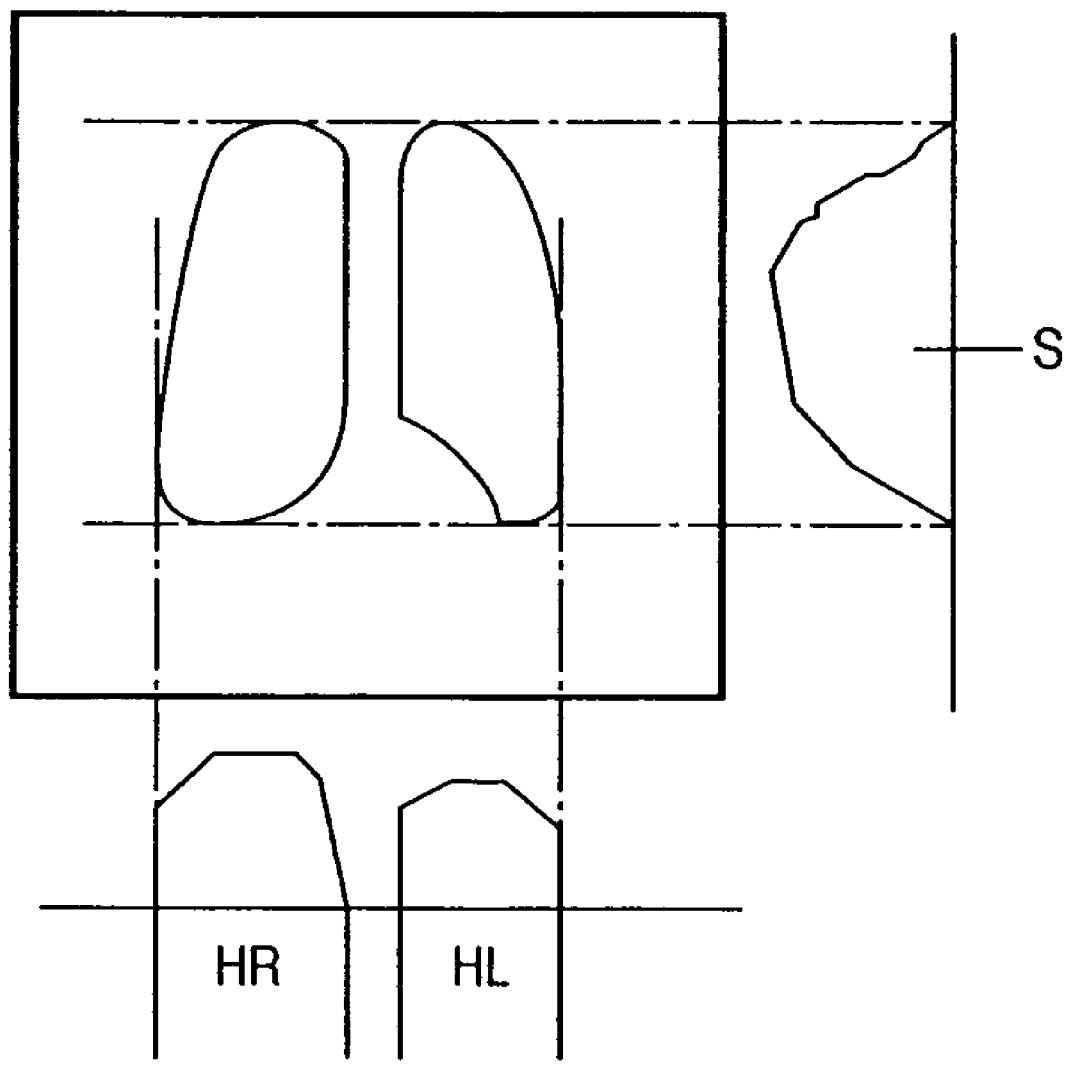
FIG. 9 is a view for explaining the projections of a binary lung field image in the vertical and horizontal directions.

In step S3, as shown in FIG. 9, a lung field area S is calculated by calculating the number of pixels, of the binary lung field image, which are set to "1". In lung field height calculation in step S4, a projection of the binary lung field image is calculated in the longitudinal direction, the right and left lungs are separated in terms of images on the basis of the projection, and projections of the binary right lung image and binary left lung image are calculated in the lateral direction. The lengths of the respective projections become a right lung height HR and left lung height HL, respectively.

In forming area and height variation waveforms in step S5, the lung field areas S, right lung heights HR, and left lung heights HL of the N input images are calculated and plotted. In plotting the calculated values, they can be interpolated by a spline function as well as being connected by straight lines.

In determining an inspiration mode and expiration mode in step S6, an interval in which the lung field area S or the like increases with time is defined as an inspiration mode, and an interval in which the area S decreases with time is defined as an expiration mode. It is then determined which image belongs to which interval, thereby recognizing each image as an image corresponding to an inspiration mode or expiration mode. The lung field areas S, right lung heights HR, and left lung heights HL are stored in the image storage unit 112, together with the images.

In image sorting in step S7, the respective images are sorted depending on whether each image belongs to an inspiration mode or expiration mode, and by using the lung field areas and lung field heights. More specifically, the images are sorted according to the inspiration mode and expiration mode. The images belonging to the inspiration mode are sorted in order of increasing lung field area. The images belonging to the expiration mode are sorted in order of decreasing lung field area. Finally, all the N images are sorted in order of inspiration and expiration, and the sorting operation is complete. The sorted images are stored in the image storage unit 112.

In the above case, sorting is performed by using lung field areas. However, sorting can be performed by using the lung field heights of the two lungs or the lung field height of one lung. In the above case, the images are sorted in order of inspiration and expiration. However, they may be sorted in order of expiration and inspiration.

When N images are radiographed in a respiratory cycle in year P+1 one year after P year, the N images are subjected to the same processing as in the case of radiography in year P. When all the N images currently radiographed are separated into an inspiration mode and expiration mode and sorted in order of inspiration and expiration, thereby completing the sorting operation. The sorted images are stored in the image storage unit 112 as in the above case. A reference image approximate to a respiration phase of a basic image is determined on the basis of the lung field area S.

The basic images radiographed in year P+1 are compared with the reference images radiographed in year P on the basis of the logical product or logical sum of the lung field areas and lung field heights which are calculated by the image analyzing unit 110 by the above method and stored in the image storage unit 112. In this case, the images in the same mode are compared. That is, the images radiographed in an inspiration mode in year P+1 are compared with the images radiographed in an inspiration mode in year P, and the images radiographed in an expiration mode in year P+1 are compared with the images radiographed in an expiration mode in year P. Even if the lung field area or lung field heights of images are equal to each other, since the relative positional relationship between the lung field tissue and the ribs in an inspiration mode may be different from that in an expiration mode, performing difference processing between images in the same mode makes it possible to obtain accurate difference images.

Figure 10:
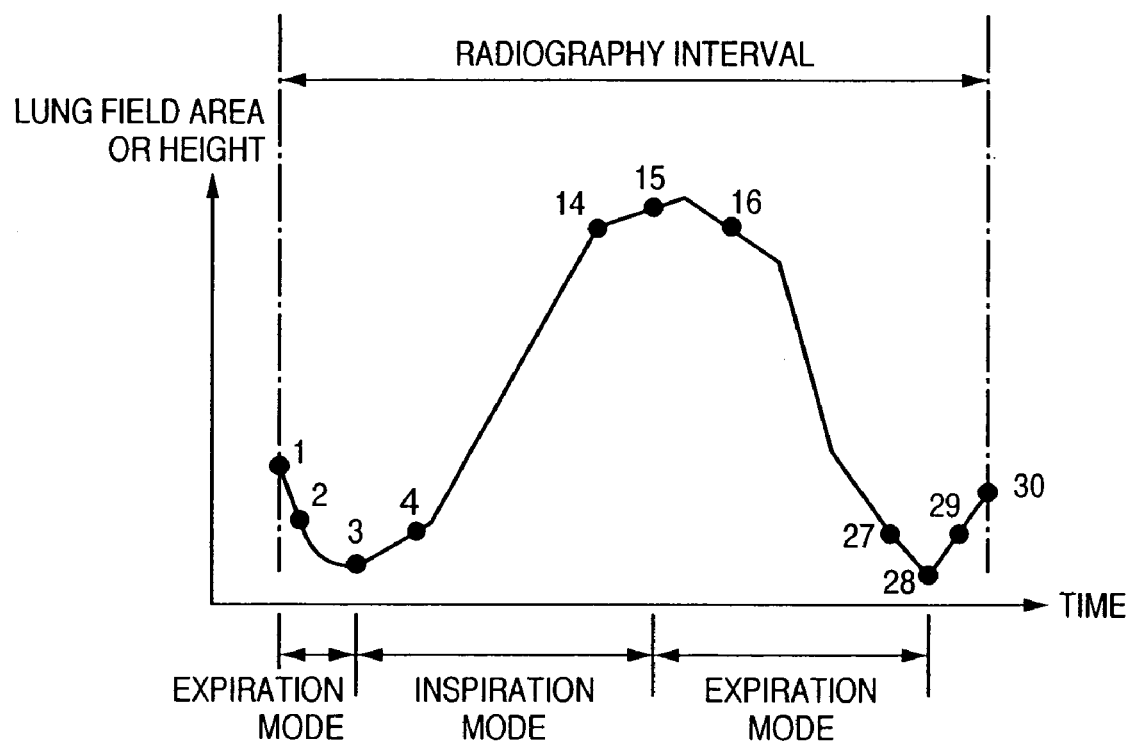
FIG. 10 is a graph in a radiography interval in year P+1.

Assume that, of the reference images radiographed in year P, the second to 14th images belong to the inspiration mode, and the 15th to 29th images belong to the expiration mode as shown in FIG. 2, whereas, of the basic images radiographed in year P+1 shown in FIG. 10, the third to 15th images belong to the inspiration mode, and the 16th to 28th images belong to the expiration mode.

In this case, when a reference image, of the images belonging to the inpiration mode, which is approximate to a respiration phase of a basic image is to be determined, (lung field area or lung field height of third basic image in year P+1—lung field area or lung field height of second reference image in year P) is obtained, and (lung field area or lung field height of third basic image in year P+1—lung field area or lung field height of third reference image in year P) is obtained.

In the same manner, differences are calculated up to the 14th reference image while the reference images are sequentially switched, and the obtained lung field area differences are compared, thereby determining an image exhibiting the smallest difference, and more specifically, the reference 102 as an image approximate to the respiration phase of the basic image 103.

With regard to the expiration mode as well, a reference image having a phase approximate to the respiration phase of a basic image is determined in the same manner. That is, the 16th basic image is also subjected to the same processing as described above, and (lung filed area or lung field height of 16th basic image in year P+1—lung field area or lung field height of 15th reference image in year P) is obtained. Then, (lung field area or lung field height of 16th basic image in year P+1—lung field area or lung field height of 16th reference image in year P) is obtained. Likewise, differences are sequentially calculated up to the 29th reference image in the same manner as described above while the reference images are switched.

In this manner, reference images having phases approximate to the respiration phases of all the basic images are determined.

The above processing is performed on the basis of a logical sum of a lung field area or a lung field height of each image constituting the respiratory moving images. The processing can be performed on the basis of a logical product. Specifically, in order to perform approximation determination, (lung filed area or lung field height of the image belonging to the inpiration mode in year P+1/lung filed area or lung field height of the image belonging to the inpiration mode in year P) is obtained. The set of images having a value obtained closest to 1 exhibit the smallest phase difference.

With regard to the expiration mode as well, the processing can be performed on the basis of a logical product.

Figure 11:
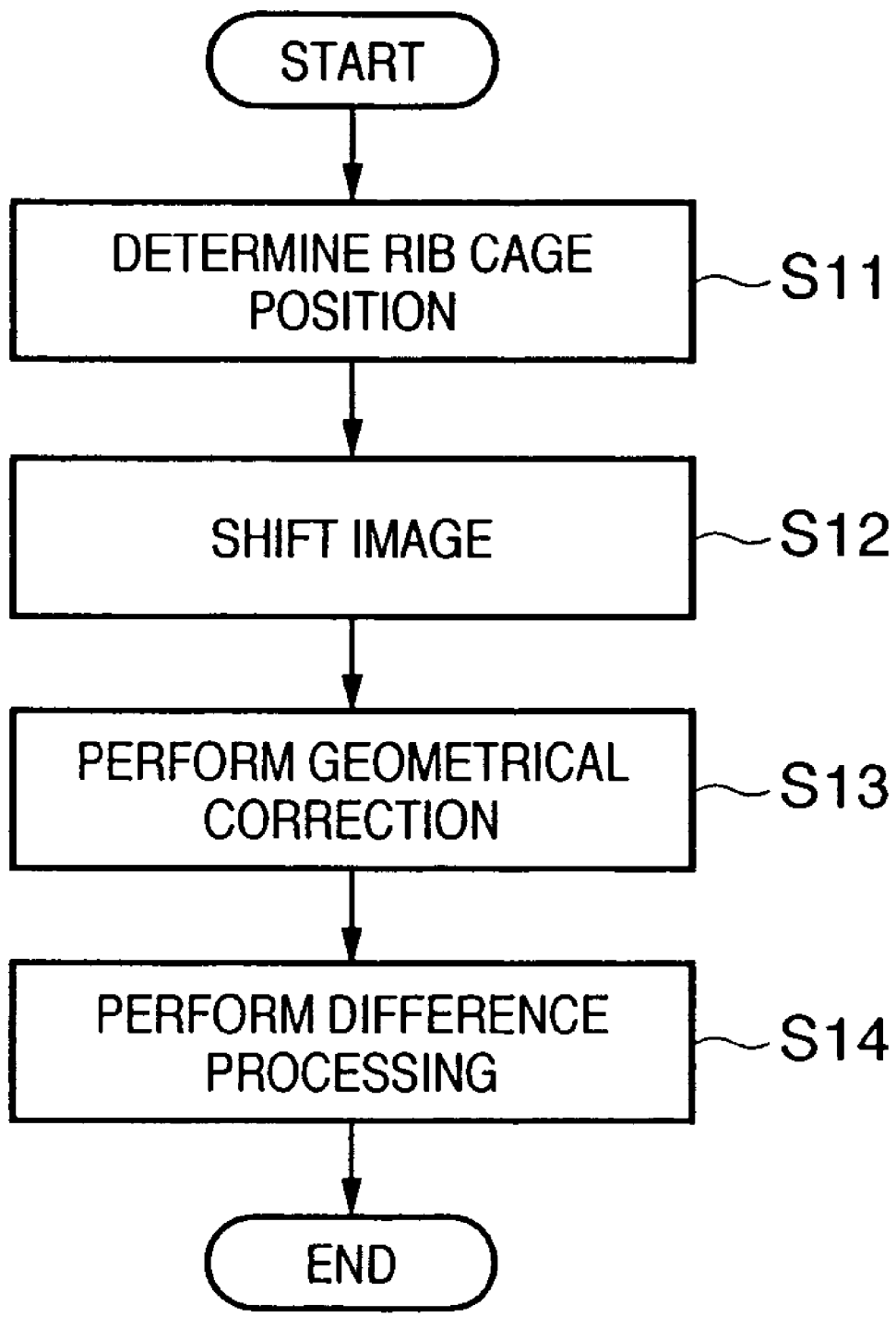
FIG. 11 is a flowchart showing difference operation.

FIG. 11 is a flowchart associated with image differences. The operation of the image difference computing unit will be described. Chest X-ray imaging is generally performed while the object Y is standing, i.e., in a standing position. For this reason, it never occurs that radiography in year P and radiography in year P+1 are performed in the same in the same body position. When images radiographed in different body positions are subjected to difference processing, an artifact is caused by a positional shift. It is therefore preferable to perform difference processing upon correction of this positional shift.

In step S11, the position of the rib cage is determined on the basis of a binary lung field image. This position is determined by calculating the projections of the binary lung field image in the vertical and horizontal directions. As shown in FIG. 9, since the projections of the binary lung field image exhibit relatively steep rise distributions, the rib cage can be specified as indicate by the broken lines by binarizing the obtained projections with a predetermined value.

When the position of the rib cage is determined with respect to a basic image and a reference image approximate to the respiration phase of the basic image, the image in year P is shifted (moved) to the rib cage position of the image in year P+1 which serves as a basic image in step S12. This image is shifted to make the apexes of the upper portions of the lungs coincide with those of the basic image and to make the central portion coincide with that of the basic image so as to reduce the lateral offset of the rib cage. This completes positioning of the reference image to the basic image.

Figure 12:
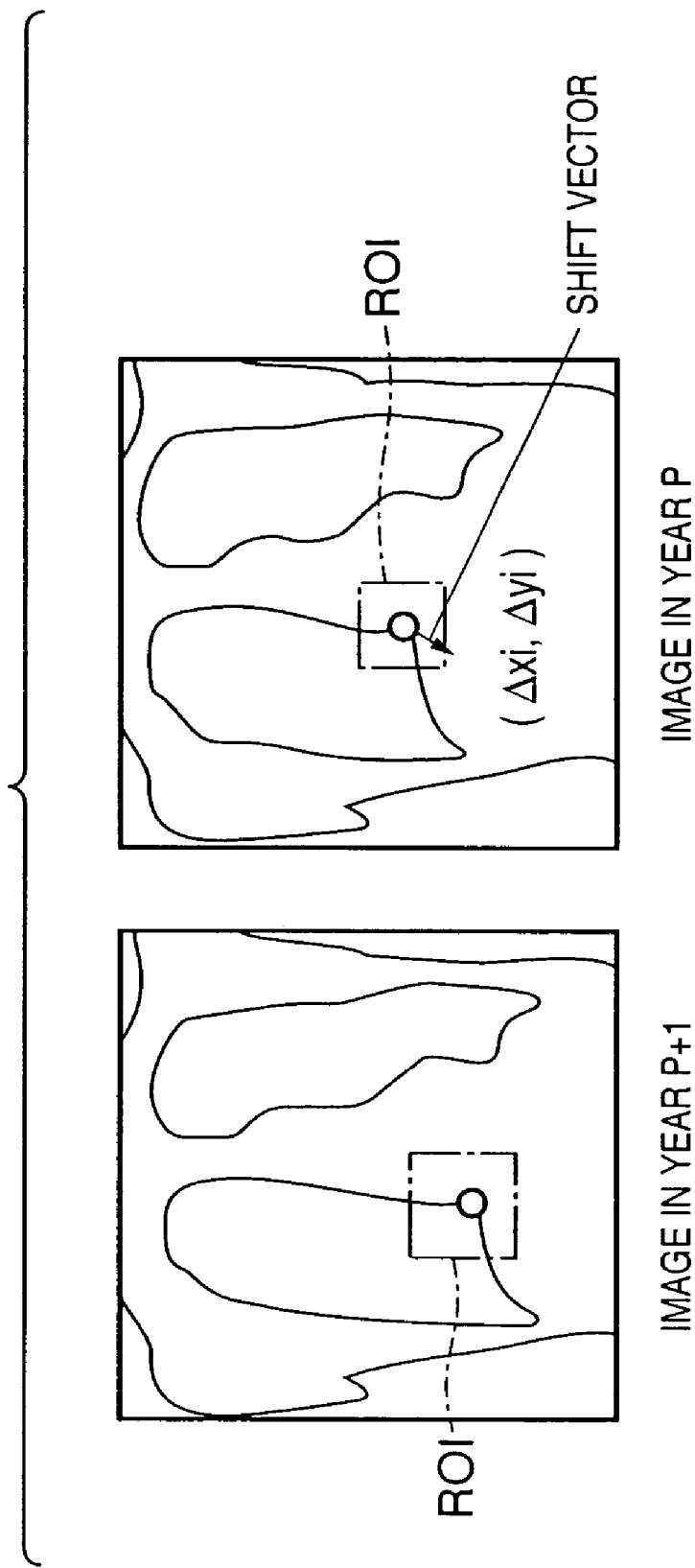
FIG. 12 is a view for explaining ROIs and shift vectors.

In step S13, as shown in FIG. 12, ROIs (Regions Of Interest) are respectively set in the basic image in year P+1 and the reference image in year P which is approximate to the respiration phase of the basic image, and the cross-correlation coefficient of the image data of each RO is calculated, thereby calculating a shift vector on the basis of the position where the coefficient is maximized. Such ROIs are set at a plurality of positions in the rib cage, and a shift vector for each ROI is calculated in the same manner. A parameter for two-dimensionally interpolating the shift vector at the ROI position obtained for each ROI is determined. As an interpolation model, a three-dimensional convolution interpolation method, a polynomial approximation method, or the like is used.

Figure 13:
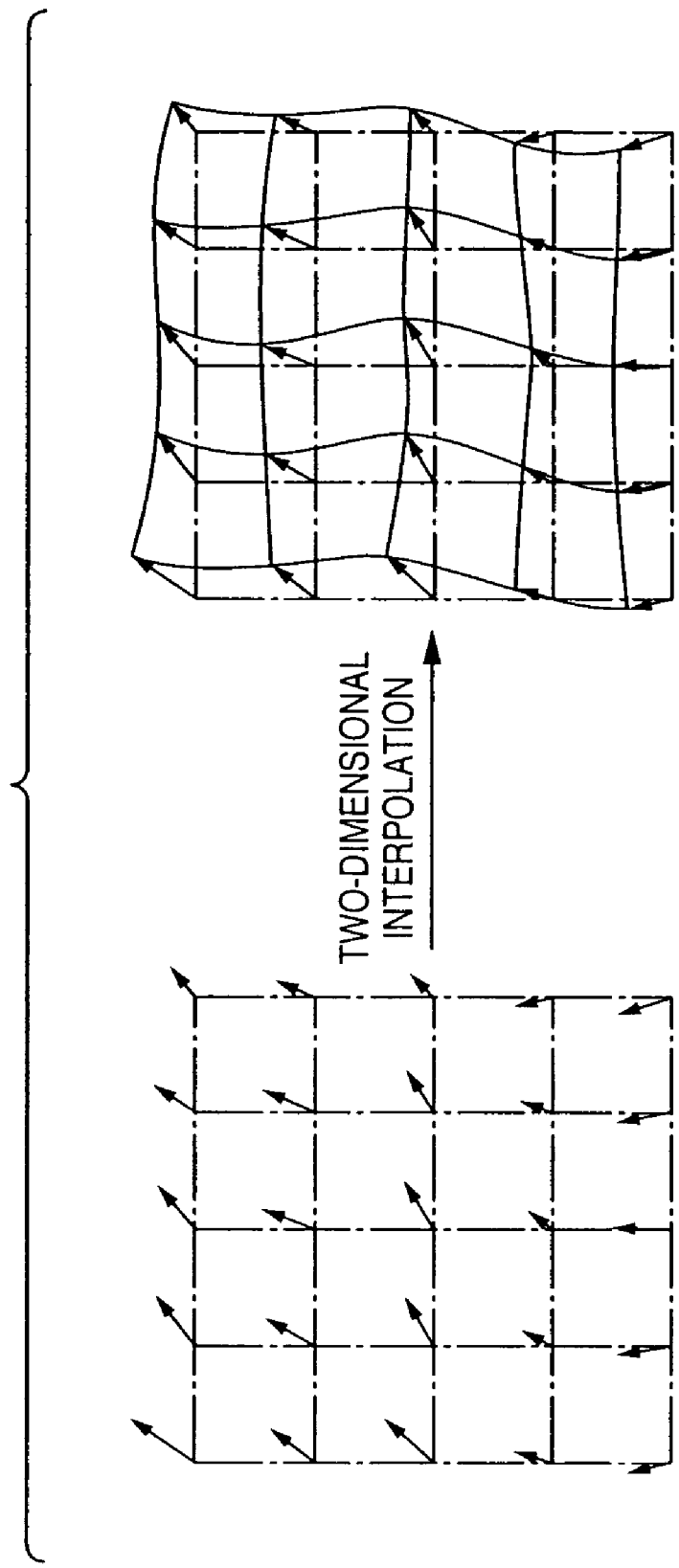
FIG. 13 is a view for explaining two-dimensional interpolation for shift vectors.
Figure 14:
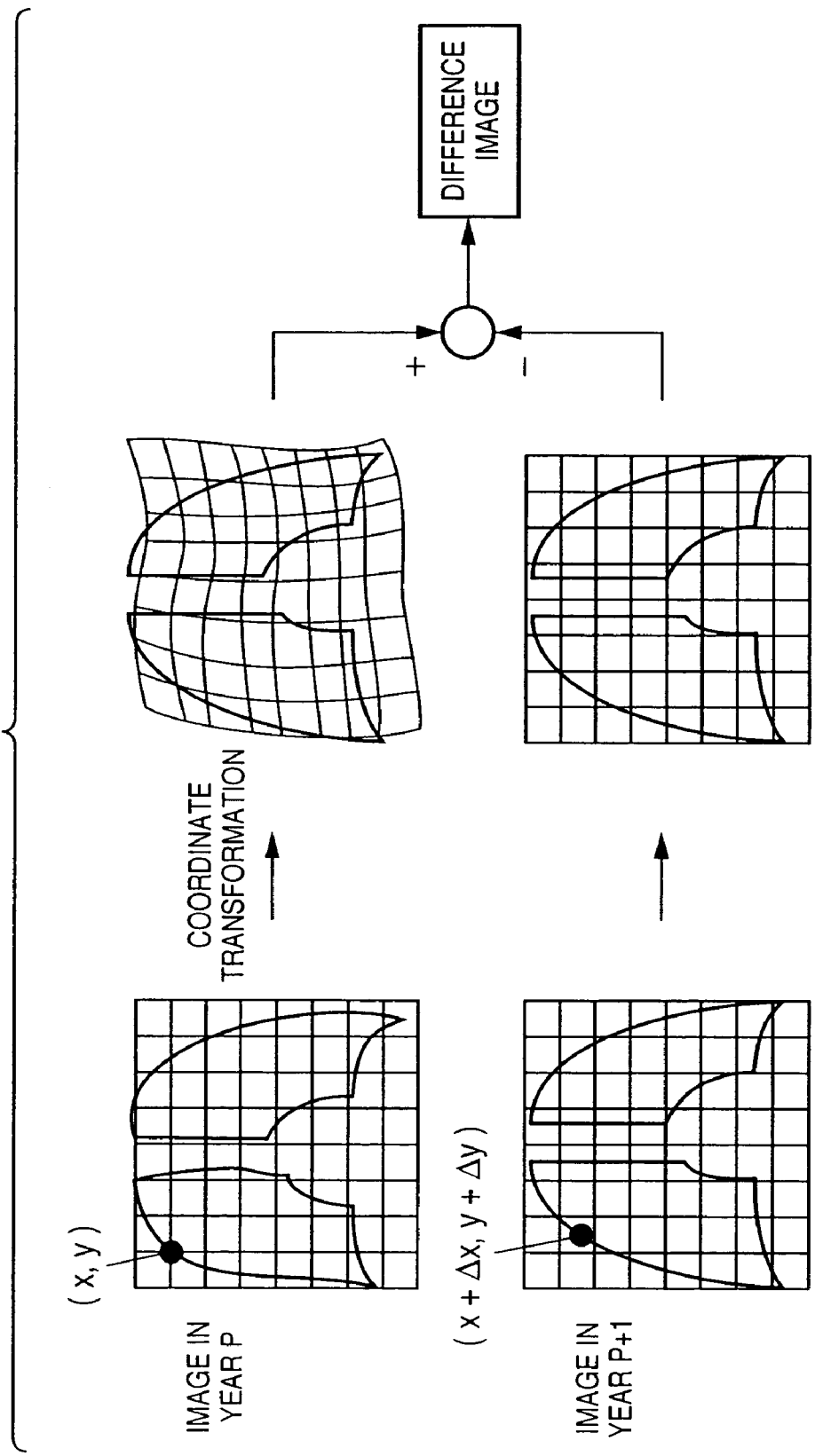
FIG. 14 is a view for explaining coordinate transformation and difference processing.

FIG. 13 shows the result obtained by two-dimensional interpolation processing of the shift vector obtained for each ROI. As shown in FIG. 14, the image in year P which is a reference image is coordinate-transformed by the interpolation expression obtained in this manner, thereby performing geometrical correction. In step S14, a difference between the basic image in year P+1 and the reference image in year P is obtained for each pixel, thereby obtaining a difference image.

Processing similar to the above processing is repeatedly performed between the second to 14th basic images in the inspiration mode and the 15th to 29th basic images in the expiration mode and reference images approximate to the respiration phases of the respective basic images, thereby obtaining difference images corresponding to the inspiration mode and expiration mode, respectively. The obtained difference images are sorted in accordance with the sort order of the basic images, and are consecutively displayed as moving images on the image display unit 113.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-384883 filed on Nov. 14, 2003, which is hereby incorporated by reference herein.

What is claimed is:

1. A radiographic image processing apparatus comprising:
an input unit which inputs a plurality of respiratory moving images radiographed at two different time points in a respiratory cycle;
an image analyzing unit which analyzes the respective respiratory moving images and determines a reference image at one time point which has a respiration phase approximate to a respiration phase of a basic image at the other time point; and
a difference computing unit which performs difference computation between the obtained basic image and the reference image.

2. An apparatus according to claim 1, wherein said image analyzing unit determines a phase in a respiratory cycle on the basis of a logical sum or a logical product of a lung field area or a lung field height of each image constituting the respiratory moving images, and performs approximation determination on the basis of the phase.

3. An apparatus according to claim 2, wherein said image analyzing unit sorts phases in a respiratory cycle according to an expiration mode and inspiration mode, and performs approximate determination only within the same mode.

4. An apparatus according to claim 1, wherein said difference computing unit obtains a difference between the basic image and the reference image upon performing geometrical correction of at least one of the basic image and the reference image on the basis of positioning of the basic image and the reference image and a logical sum or a logical product of the basic image.

5. A radiographic image processing method comprising:
a step of inputting a plurality of respiratory moving images radiographed at two different time points in a respiratory cycle;
a step of analyzing the respective respiratory moving images and determining a reference image at one time point which has a respiration phase approximate to a respiration phase of a basic image at the other time point; and
a step of obtaining a difference between the obtained basic image and the reference image and extracting a change between the two images over time.

* * * * *